US011279254B2

(12) United States Patent
Ando et al.

(10) Patent No.: US 11,279,254 B2
(45) Date of Patent: Mar. 22, 2022

(54) VEHICLE

(71) Applicant: Toyota Jidosha Kabushiki Kaisha, Toyota (JP)

(72) Inventors: Toru Ando, Obu (JP); Koichi Kojima, Toyota (JP); Takashi Yamana, Toyota (JP); Takahiko Mase, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/065,249

(22) Filed: Oct. 7, 2020

(65) Prior Publication Data

US 2021/0107370 A1   Apr. 15, 2021

(30) Foreign Application Priority Data

Oct. 9, 2019 (JP) .............................. JP2019-185830

(51) Int. Cl.
*B60L 53/60* (2019.01)
*B60L 53/18* (2019.01)
*B60L 53/16* (2019.01)
*H02J 7/00* (2006.01)
*B60L 53/65* (2019.01)
*B60R 25/24* (2013.01)
*B60L 53/30* (2019.01)

(52) U.S. Cl.
CPC .............. *B60L 53/60* (2019.02); *B60L 53/16* (2019.02); *B60L 53/18* (2019.02); *B60L 53/305* (2019.02); *B60L 53/65* (2019.02); *B60R 25/245* (2013.01); *H02J 7/0045* (2013.01)

(58) Field of Classification Search
CPC ........ B60L 53/60; B60L 53/305; B60L 53/16; B60L 53/18; B60L 53/65; B60R 25/245; H02J 7/0045
USPC ......................................................... 320/109
See application file for complete search history.

(56) References Cited

U.S. PATENT DOCUMENTS

| 9,346,365 B1* | 5/2016 | Penilla ................... B60L 53/14 |
| 10,268,848 B2* | 4/2019 | Cocchini ................ H01L 23/642 |
| 10,654,363 B2* | 5/2020 | Hourtane ................ B60L 53/14 |
| 10,703,220 B2* | 7/2020 | Ghabra ................ H04L 63/0876 |
| 10,967,753 B2* | 4/2021 | Kusumi ................ B60L 53/14 |
| 11,104,246 B2* | 8/2021 | Reynolds .............. H02J 7/0047 |
| 2009/0082916 A1 | 3/2009 | Tanaka |
| 2010/0207588 A1* | 8/2010 | Lowenthal ............ B60L 53/665 320/165 |

(Continued)

FOREIGN PATENT DOCUMENTS

| CN | 104417387 A | 3/2015 |
| CN | 104417387 B | 6/2018 |

(Continued)

*Primary Examiner* — Suresh Memula
(74) *Attorney, Agent, or Firm* — Dinsmore & Shohl LLP

(57) ABSTRACT

When a prescribed operation is performed during execution of AC charging, an ECU of a vehicle performs a charging stop process. The ECU determines whether or not a resume condition is satisfied during the charging stop process. When the resume condition is satisfied and when a charging connector is connected to an inlet, the ECU brings a locking device to a locked state and resumes the AC charging. When the resume condition is not satisfied or when the charging connector is not connected to the inlet, the ECU does not resume the AC charging.

8 Claims, 7 Drawing Sheets

(56) References Cited

U.S. PATENT DOCUMENTS

| | | | | |
|---|---|---|---|---|
| 2015/0054460 | A1* | 2/2015 | Epstein | B60L 58/26 |
| | | | | 320/109 |
| 2015/0061594 | A1 | 3/2015 | Hockenstrom et al. | |
| 2015/0329002 | A1* | 11/2015 | Broecker | B60L 58/12 |
| | | | | 320/109 |
| 2016/0207409 | A1* | 7/2016 | Ueo | B60L 53/14 |
| 2018/0065495 | A1* | 3/2018 | Masuda | B60L 53/65 |
| 2018/0147948 | A1* | 5/2018 | Ohiwa | H02J 7/1492 |
| 2018/0269701 | A1* | 9/2018 | Dai | H02M 3/33523 |
| 2020/0247261 | A1* | 8/2020 | Kojima | B60L 53/66 |
| 2021/0001734 | A1* | 1/2021 | Reynolds | B60L 53/305 |
| 2021/0237605 | A1* | 8/2021 | Ando | B60L 3/00 |

FOREIGN PATENT DOCUMENTS

| | | | |
|---|---|---|---|
| DE | 102017124469 A1 * | 2/2019 | |
| DE | 102019127197 A1 * | 4/2019 | |
| DE | 102020108950 A1 * | 9/2020 | |
| EP | 2196350 A1 * | 6/2010 | |
| EP | 2842793 A1 | 3/2015 | |
| JP | 2009-081917 A | 4/2009 | |
| JP | 2013-240127 A | 11/2013 | |

\* cited by examiner

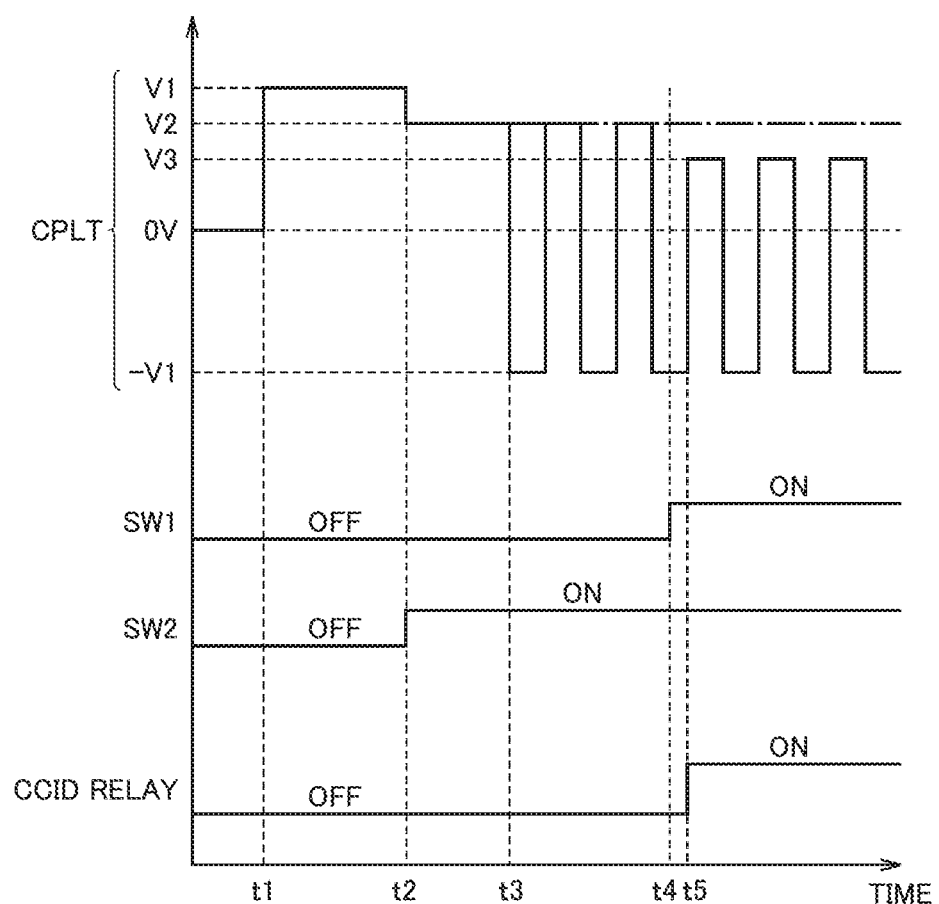

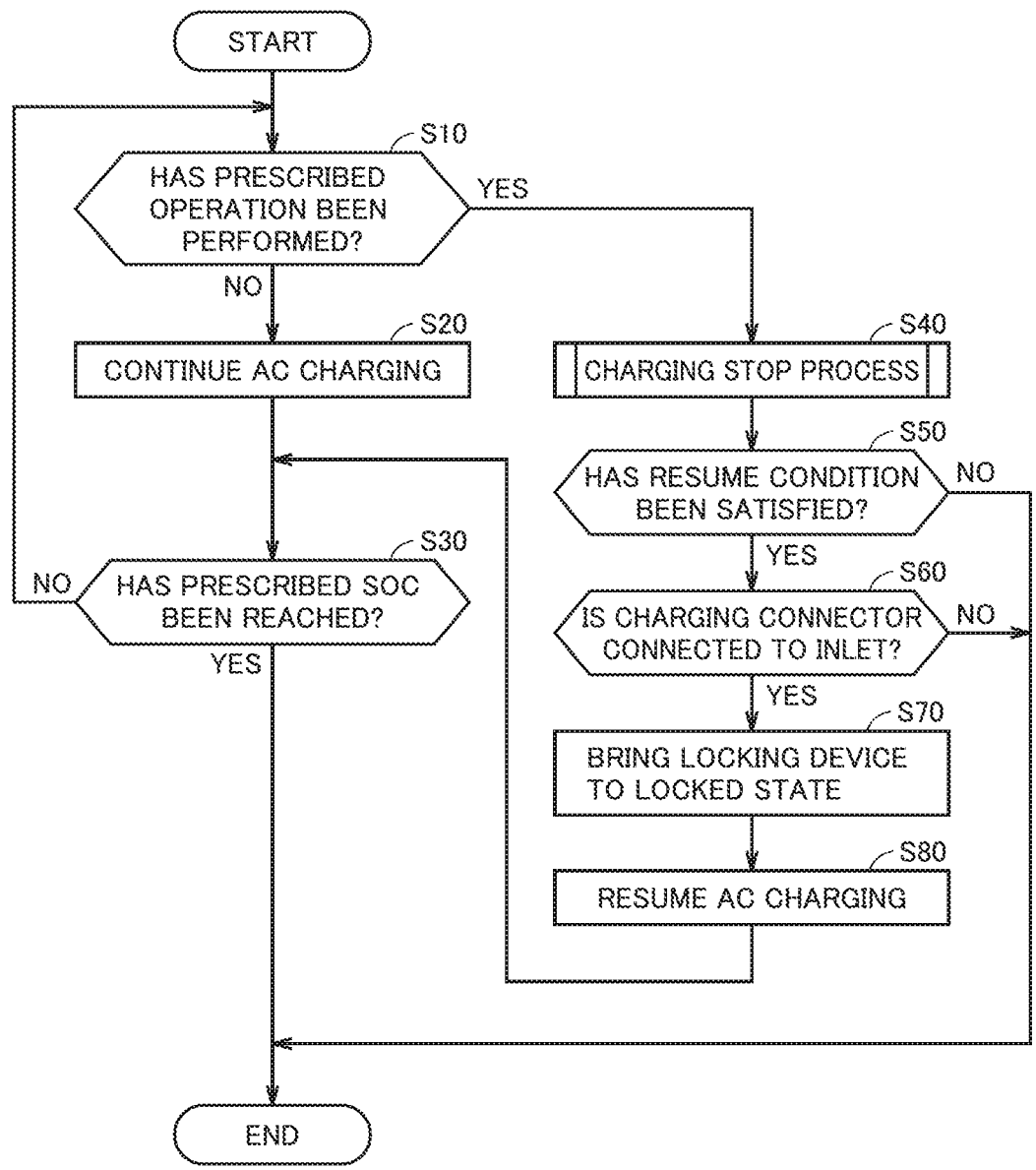

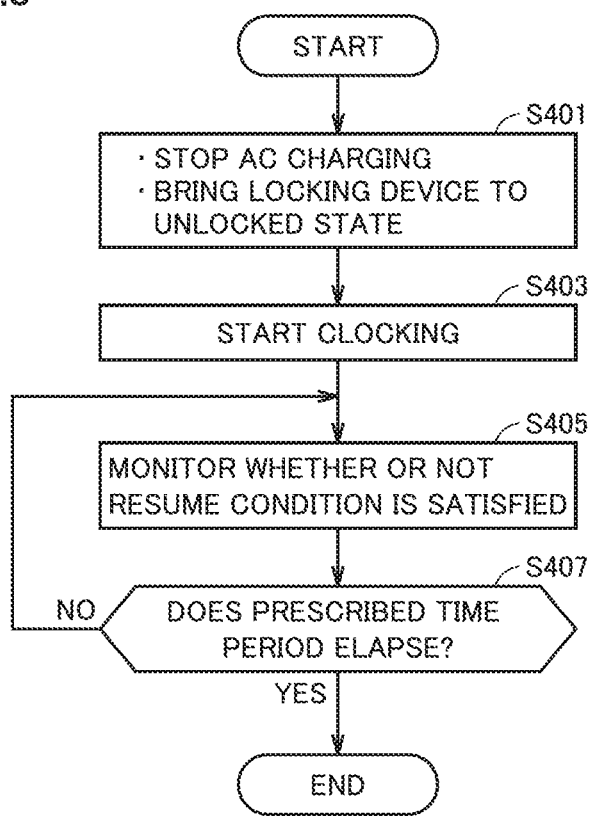

VEHICLE

CROSS REFERENCE TO RELATED APPLICATIONS

This nonprovisional application claims priority to Japanese Patent Application No. 2019-185830 filed on Oct. 9, 2019 with the Japan Patent Office, the entire contents of which are hereby incorporated by reference.

BACKGROUND

Field

The present disclosure relates to a vehicle that performs external charging to charge a power storage device mounted on the vehicle, using electric power supplied from a power supply external to the vehicle.

Description of the Background Art

US2015/0061594 discloses a vehicle that performs alternating current (AC) charging to charge a power storage device mounted on the vehicle, using electric power supplied from an AC power supply external to the vehicle through a charging cable. The vehicle includes an inlet connectable to a connector provided at a tip of the charging cable, and a locking device that switches between a locked state in which the connector connected to the inlet cannot be removed from the inlet and an unlocked state in which the connector connected to the inlet can be removed from the inlet. The locking device is brought from the locked state to the unlocked state in response to an operation of a release switch provided on a smart key or the like of the vehicle. Hereinafter, bringing the locking device from the locked state to the unlocked state may be referred to as "unlocking".

When unlocking is performed during execution of the AC charging, the vehicle stops the AC charging. When the connector is not disconnected from the inlet within a certain time period after the AC charging is stopped, the vehicle brings the locking device to the locked state and resumes the AC charging.

SUMMARY

A user may perform unlocking with the intention of ending the AC charging. In this case, disconnection of the connector from the inlet within the certain time period may be impossible for some reasons. In the above-described case, the vehicle disclosed in US2015/0061594 resumes the AC charging even though the user has no intention of continuing the AC charging.

The present disclosure has been made to solve the above-described problem, and an object of the present disclosure is to provide a vehicle that can resume and end external charging based on a user's intention when the external charging is stopped.

(1) A vehicle according to the present disclosure is a vehicle that performs external charging to charge a power storage device mounted on the vehicle, using electric power supplied through a charging cable from a power supply external to the vehicle. The vehicle includes: an inlet to which a connector provided in the charging cable is connectable; a locking device that switches between a locked state and an unlocked state, the connector connected to the inlet being not able to be removed from the inlet in the locked state, the connector connected to the inlet being able to be removed from the inlet in the unlocked state; and a controller that permits execution of the external charging when the locking device is in the locked state. When the controller detects that the connector is connected to the inlet, the controller brings the locking device to the locked state. When a prescribed operation is performed during execution of the external charging, the controller brings the locking device to the unlocked state and stops the external charging. When a predetermined resume condition is satisfied within a prescribed time period after the external charging is stopped, and when the connector is connected to the inlet, the controller brings the locking device to the locked state and resumes the external charging.

With the above-described configuration, when the resume condition is satisfied within the prescribed time period after the external charging is stopped, and when the connector is connected to the inlet, the external charging is resumed. For the resumption of the external charging, it is determined whether or not the resume condition is satisfied within the prescribed time period, in addition to determination as to whether or not the connector is connected to the inlet after a lapse of the prescribed time period. A condition that makes it possible to estimate that the user has an intention of resuming the external charging is set as the resume condition. For example, a specific operation performed on the vehicle can be set as the resume condition. Thus, by determining whether or not the resume condition is satisfied, it can be estimated whether or not the user has an intention of resuming the external charging. Since the external charging is resumed when the connector is connected to the inlet and when the resume condition is satisfied, the external charging can be resumed based on the user's intention.

(2) In an embodiment, when the resume condition is not satisfied within the prescribed time period, the controller does not resume the external charging.

With the above-described configuration, when the resume condition is not satisfied within the prescribed time period after the external charging is stopped, it is estimated that the user has no intention of resuming the external charging and the external charging is not resumed, even if the connector is connected to the inlet. By determining whether or not the resume condition is satisfied, the external charging can be ended based on the user's intention. For example, in the case of a configuration in which the external charging is resumed when the connector is connected to the inlet after a lapse of the prescribed time period from the stop of the external charging, an operation for stopping the external charging is necessary. However, the above-described configuration can eliminate the need for the operation for stopping the external charging.

(3) In an embodiment, the resume condition includes at least one of a condition that a door of the vehicle has been opened and a condition that the door of the vehicle has been closed.

With the above-described configuration, the resume condition includes a condition that an operation for opening the door of the vehicle has been performed on the vehicle by the user and/or a condition that an operation for closing the door of the vehicle has been performed on the vehicle by the user. The user having performed the operation for opening the door of the vehicle and/or the operation for closing the door of the vehicle without disconnection of the connector from the inlet even after a lapse of the prescribed time period from the stop of the external charging means that the user is, for example, taking out a baggage in the vehicle, and thus, it can be estimated that the user has no intention of ending the external charging (has an intention of resuming the external charging). In such a case, the external charging can be resumed.

(4) In an embodiment, the vehicle further includes a door lock device that prohibits opening and closing of a door of the vehicle. The resume condition includes a condition that an operation for bringing the door lock device to a door-locked state has been performed.

With the above-described configuration, the resume condition includes the condition that the operation for bringing the door lock device to the door-locked state has been performed. When the user has performed the operation for bringing the door lock device to the door-locked state without disconnection of the connector from the inlet even after a lapse of the prescribed time period from the stop of the external charging, it can be estimated that the user has an intention of resuming the external charging. In such a case, the external charging can be resumed.

(5) In an embodiment, the prescribed operation includes a door-unlock operation for releasing the door-locked state of the door lock device.

With the above-described configuration, the user can stop the external charging by performing the door-unlock operation.

(6) In an embodiment, the vehicle further includes an antenna that transmits a signal to a smart key of the vehicle, the smart key being located within a prescribed range from the vehicle. The resume condition includes a condition that the smart key has moved from within the prescribed range to outside the prescribed range. When the controller receives, from the smart key, a response signal to the signal transmitted through the antenna, the controller determines that the smart key is located within the prescribed range, and when the controller does not receive the response signal from the smart key, the controller determines that the smart key is located outside the prescribed range.

With the above-described configuration, the resume condition includes the condition that the smart key has moved from within the prescribed range to outside the prescribed range. When the smart key has moved from within the prescribed range to outside the prescribed range (i.e., the user has moved) without disconnection of the connector from the inlet even after a lapse of the prescribed time period from the stop of the external charging, it can be estimated that the user has an intention of resuming the external charging. In such a case, the external charging can be resumed.

(7) In an embodiment, the smart key is provided with a first release switch that brings the locking device to the unlocked state. The prescribed operation includes an operation of the first release switch.

With the above-described configuration, the user can stop the external charging by operating the first release switch provided on the smart key.

(8) In an embodiment, the vehicle further includes a second release switch that brings the locking device to the unlocked state. The prescribed operation includes an operation of the second release switch.

With the above-described configuration, the user can stop the external charging by operating the second release switch provided in the vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 shows a correspondence relationship among states of switches SW1 and SW2, a potential of a pilot signal CPLT, and a state of a CCID relay.

FIG. 7 is a flowchart showing a procedure of a process performed by an ECU during AC charging.

FIG. 8 is a flowchart showing a procedure of a process performed during a charging stop process.

DETAILED DESCRIPTION

Figure 1:
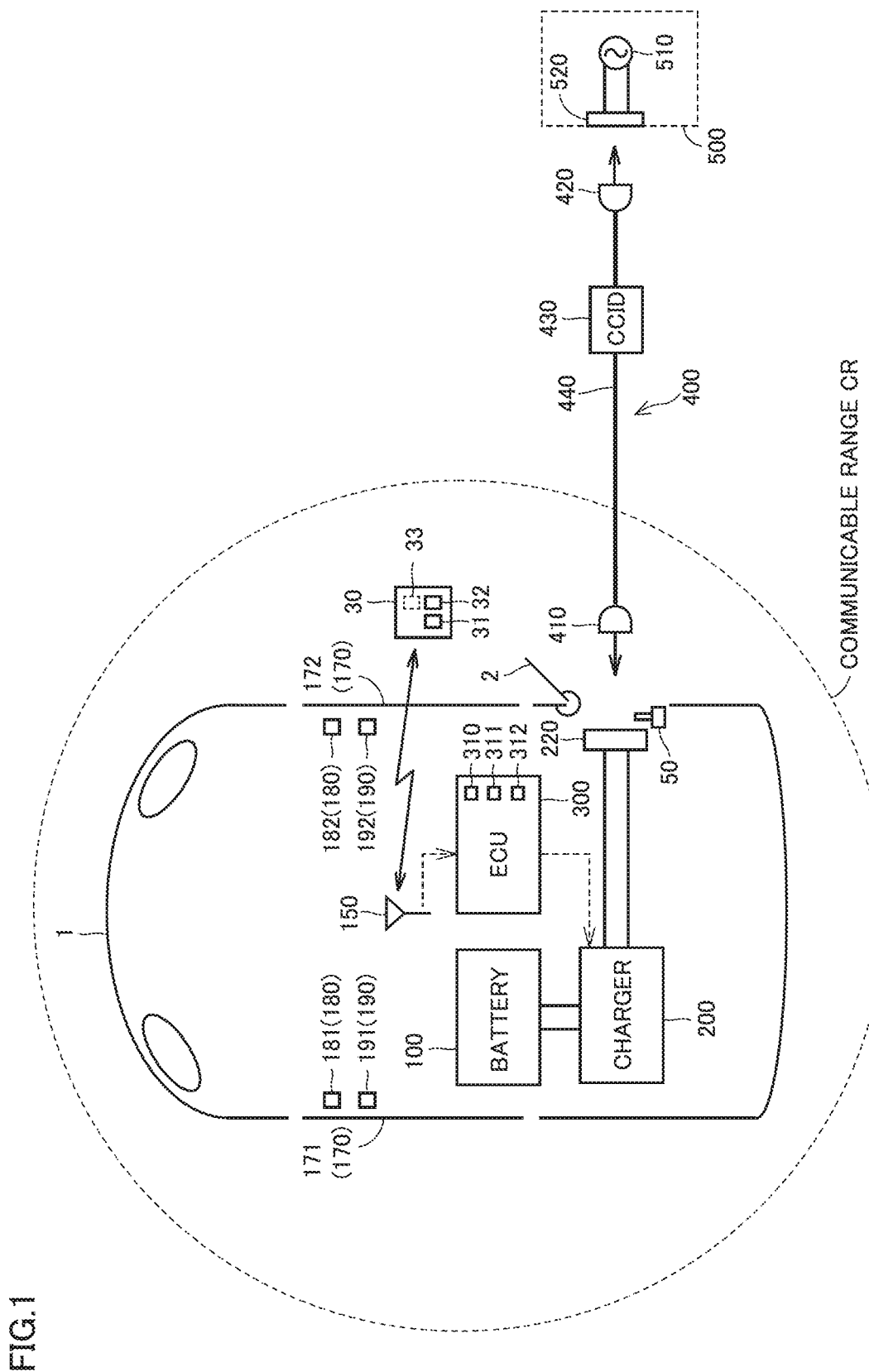
FIG. 1 is an overall configuration diagram of a charging system of a vehicle according to an embodiment.

An embodiment of the present disclosure will be described in detail hereinafter with reference to the drawings, in which the same or corresponding portions are denoted by the same reference characters and description thereof will not be repeated.

<Overall Configuration>

FIG. 1 is an overall configuration diagram of a charging system of a vehicle 1 according to the present embodiment. The charging system is a system for performing external charging to charge a battery 100 mounted on vehicle 1, using electric power supplied from a charging facility external to vehicle 1. In the present embodiment, description will be given of a case in which AC charging for charging battery 100 mounted on vehicle 1 using AC power supplied from a charging facility 500 provided, for example, at home is performed as the external charging. In the present embodiment, the case of using the AC power supplied from charging facility 500 provided at home or the like will be described as an example of the AC charging. However, AC power supplied from, for example, a public charging facility (charging stand) may be used.

Referring to FIG. 1, the charging system includes vehicle 1, a charging cable 400 and charging facility 500.

Charging facility 500 includes an AC power supply 510 and an electrical outlet 520. Electrical outlet 520 is, for example, an AC electrical outlet for general household use.

During the AC charging, charging facility 500 and vehicle 1 are connected by charging cable 400. Charging cable 400 includes an AC power line 440, a charging connector 410 provided at one end of AC power line 440, a plug 420 provided at the other end of AC power line 440, and a charging circuit interrupt device (hereinafter, also referred to as "CCID") 430 provided on AC power line 440. Charging connector 410 is connectable to an inlet 220 of vehicle 1. Plug 420 is connectable to electrical outlet 520 of charging facility 500. CCID 430 is a circuit for switching between supply and cutoff of electric power from charging facility 500 to vehicle 1.

Vehicle 1 is an electric vehicle that travels by driving a not-shown traveling motor using electric power stored in battery 100. Vehicle 1 may be any vehicle as long as it performs the external charging of battery 100, and vehicle 1 may be, for example, a fuel cell vehicle or a plug-in hybrid vehicle.

Vehicle 1 includes battery 100, an antenna 150, entrance doors 170 (a left door 171 and a right door 172), and an electronic control unit (ECU) 300. In addition, vehicle 1 includes a charging lid 2, a charger 200 and inlet 220 as a configuration for performing the AC charging.

Battery 100 is mounted on vehicle 1 as a driving power source (i.e., motive power source) for vehicle 1. Battery 100 includes a plurality of stacked cells. Each cell is, for example, a secondary cell such as a nickel metal-hydride cell or a lithium ion cell. Each cell may be a cell having a liquid electrolyte between a positive electrode and a negative electrode, or may be a cell having a solid electrolyte (all-solid-state cell). Battery 100 may be any battery as long as it is a rechargeable DC power supply, and a large-capacitance capacitor can also be used.

Antenna 150 communicates with a smart key (electronic key) 30 of vehicle 1 carried by a user. When smart key 30 is located within a communicable range CR in which communication through antenna 150 is possible, ECU 300 can communicate with smart key 30 through antenna 150. In contrast, when smart key 30 is not located within communicable range CR, i.e., when smart key 30 is located outside communicable range CR, ECU 300 cannot communicate with smart key 30. Communicable range CR according to the present embodiment may be a range other than the interior of vehicle 1. "Communicable range CR" according to the present embodiment corresponds to one example of "prescribed range" according to the present disclosure.

Entrance doors 170 (left door 171 and right door 172) are opened and closed by a user's manual operation, mainly when the user gets on and off vehicle 1 or when the user loads and unloads a baggage into and from vehicle 1. Each entrance door 170 is provided with an opening and closing detection sensor 180 and a door lock device 190. Specifically, left door 171 is provided with an opening and closing detection sensor 181 and a door lock device 191. Right door 172 is provided with an opening and closing detection sensor 182 and a door lock device 192.

Opening and closing detection sensor 180 (opening and closing detection sensors 181 and 182) detects whether or not the entrance door is opened or closed, and outputs a result of detection to ECU 300. Opening and closing detection sensor 180 is, for example, a door courtesy switch or the like. When vehicle 1 has a trunk room, opening and closing detection sensor 180 is also provided on a door of the trunk room.

Door lock device 190 (door lock devices 191 and 192) switches entrance door 170 to one of a door-locked state and a door-unlocked state in accordance with a control signal from ECU 300. The door-locked state is a state in which entrance door 170 is fixed in a closed state and thus the user cannot open entrance door 170. The door-unlocked state is a state in which the door-locked state is released and thus the user can open entrance door 170.

Charging connector 410 of charging cable 400 is connectable to inlet 220. Inlet 220 is covered with charging lid 2 during the normal time. When charging lid 2 is opened, the user can connect charging connector 410 to inlet 220. During the AC charging, charging connector 410 is connected to inlet 220.

Charger 200 converts AC power received at inlet 220 into DC power that can be charged into battery 100, and outputs the DC power to battery 100. Charger 200 is controlled by ECU 300.

A locking device 50 is provided near inlet 220. Locking device 50 switches between a locked state in which charging connector 410 (charging cable 400) connected to inlet 220 cannot be removed from inlet 220 and an unlocked state in which charging connector 410 connected to inlet 220 can be removed from inlet 220. When charging connector 410 is connected to inlet 220, locking device 50 is brought from the unlocked state to the locked state in accordance with a control signal output from ECU 300.

Figure 2:
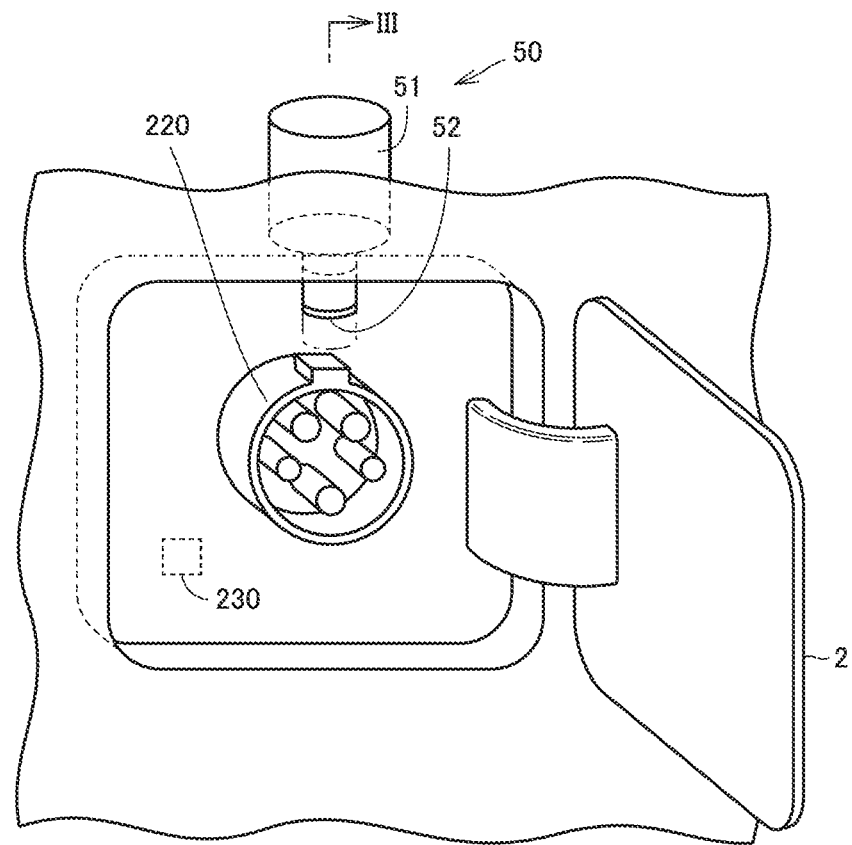
FIG. 2 shows a structure of an inlet and a structure around the inlet.
Figure 2:
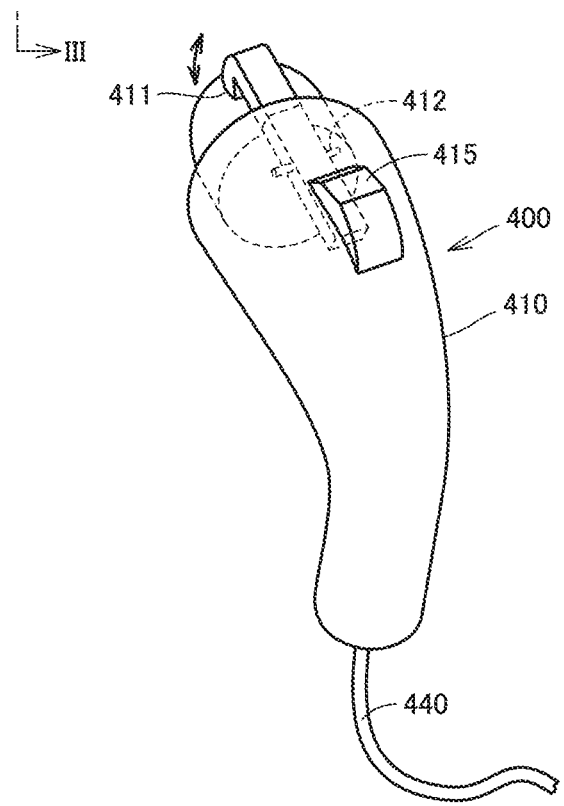
Figure 3:
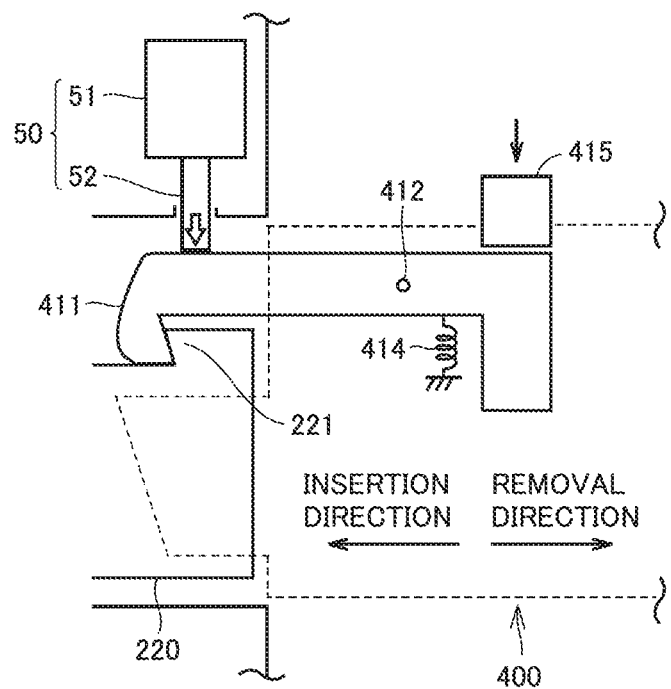
FIG. 3 is a cross-sectional view (No. 1) taken along III-III in FIG. 2.
Figure 4:
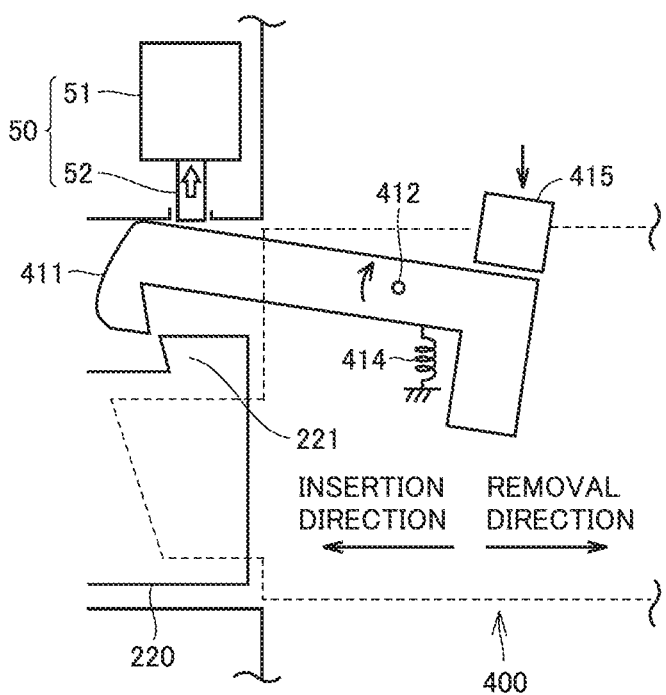
FIG. 4 is a cross-sectional view (No. 2) taken along III-III in FIG. 2.

FIG. 2 shows a structure of inlet 220 and a structure around inlet 220. FIGS. 3 and 4 are cross-sectional views taken along III-III in FIG. 2 when charging connector 410 is connected to inlet 220. Connection between charging connector 410 and inlet 220 and a structure of locking device 50 will be described with reference to FIGS. 2 to 4.

Charging connector 410 of charging cable 400 is provided with a link 411. Link 411 is rotatably attached around a shaft 412. One end of link 411 is provided with a protruding portion that engages with a projection 221 of inlet 220, and the other end of link 411 is provided with a push button 415. Link 411 is elastically biased with respect to a main body of charging connector 410 by a spring 414 (see FIGS. 3 and 4).

When charging connector 410 is inserted into inlet 220, the protruding portion of link 411 engages with projection 221 of inlet 220 (see a state of link 411 and projection 221 in FIG. 3). Therefore, charging connector 410 is not detached from inlet 220.

Locking device 50 is provided above (near) inlet 220. As described above, locking device 50 switches between the locked state in which charging connector 410 connected to inlet 220 cannot be removed from inlet 220 and the unlocked state in which charging connector 410 connected to inlet 220 can be removed from inlet 220. Locking device 50 includes a lock bar 52 that slides vertically, and an electromagnetic actuator 51 that slides lock bar 52.

In the locked state, lock bar 52 is slid downward and fixed at a position that is in contact with an upper surface of link 411 (see FIG. 3). As a result, even when push button 415 is pressed, rotation of link 411 is suppressed by lock bar 52, which prevents the protruding portion of link 411 from rising and being removed from projection 221 of inlet 220. That is, even when the user presses push button 415, the user cannot remove charging connector 410 from inlet 220.

In the unlocked state, lock bar 52 is slid upward and fixed at a position that does not suppress rotation of link 411 (see FIG. 4). As a result, lock bar 52 does not suppress rotation of link 411, and thus, when push button 415 is pressed, link 411 rotates around shaft 412 and the protruding portion provided at the end opposite to push button 415 rises. As a result, the protruding portion of link 411 is removed from projection 221 of inlet 220, and thus, charging connector 410 can be removed from inlet 220. That is, when the user presses push button 415, the user can remove charging connector 410 from inlet 220.

Referring again to FIG. 1, ECU 300 includes a central processing unit (CPU) 310, a memory 311, a timer 312, and an input and output buffer (not shown). ECU 300 receives the signals from the sensors and the like and outputs the control signals to the respective devices, and controls the respective devices. The control may be implemented by not only software but also dedicated hardware (electric circuit).

ECU 300 calculates a state of charge (SOC) of battery 100. Various known methods such as, for example, a method by current value integration (coulomb counting) or a method by estimation of an open circuit voltage (OCV) can be used as a method for calculating the SOC.

ECU 300 performs a process for determining whether or not smart key 30 of vehicle 1 is located within communicable range CR (hereinafter, also referred to as "verification process"), based on information received at antenna 150.

Specifically, for example, ECU 300 outputs a request signal to antenna 150 at the prescribed timing. When smart key 30 is located within communicable range CR, smart key 30 can receive the request signal from vehicle 1. When smart key 30 receives the request signal, smart key 30 returns a response signal that can identify a prestored ID code of its own.

When ECU 300 does not receive the response signal from smart key 30 within a defined time period after ECU 300 transmits the request signal, ECU 300 determines "unsuccessful verification" (the smart key is not located within communicable range CR). In contrast, when ECU 300 receives the response signal from smart key 30 within the defined time period after ECU 300 transmits the request signal, ECU 300 performs verification between the ID code identified by the response signal and an ID code preliminarily registered in memory 311. When these ID codes match with each other, ECU 300 determines "successful verification" (smart key 30 of vehicle 1 is located within communicable range CR). When these ID codes do not match with each other, ECU 300 determines "unsuccessful verification" (smart key 30 of vehicle 1 is not located within communicable range CR).

Smart key 30 is provided with a door lock button 31 and a door unlock button 32. When the user operates door lock button 31, a door lock request signal is transmitted to vehicle 1 through antenna 150. When the user operates door unlock button 32, a door unlock request signal is transmitted to vehicle 1 through antenna 150.

When ECU 300 receives the door lock request signal, ECU 300 controls door lock device 190 (191 and 192) to bring all entrance doors 170 (left door 171 and right door 172) to the door-locked state. When ECU 300 receives the door unlock request signal, ECU 300 controls door lock device 190 to bring all entrance doors 170 to the door-unlocked state. A range in which the door lock request signal or the door unlock request signal can be transmitted from smart key 30 may be set to be larger than above-described communicable range CR. That is, the user may operate smart key 30 at a location that is more distant from vehicle 1 than above-described communicable range CR, and switch between the door-locked state and the door-unlocked state of entrance doors 170.

When ECU 300 detects that charging connector 410 is connected to inlet 220, ECU 300 brings locking device 50 to the locked state. Unlocking (shift from the locked state to the unlocked state) is performed by operation of door unlock button 32 of smart key 30. That is, door unlock button 32 of smart key 30 and unlocking (shift to the unlocked state) of locking device 50 work together. When door unlock button 32 is operated, ECU 300 brings all entrance doors 170 to the door-unlocked state and brings locking device 50 to the unlocked state.

<AC Charging>

ECU 300 also controls AC charging. When locking device 50 is in the locked state, ECU 300 permits execution of the AC charging.

Figure 5:
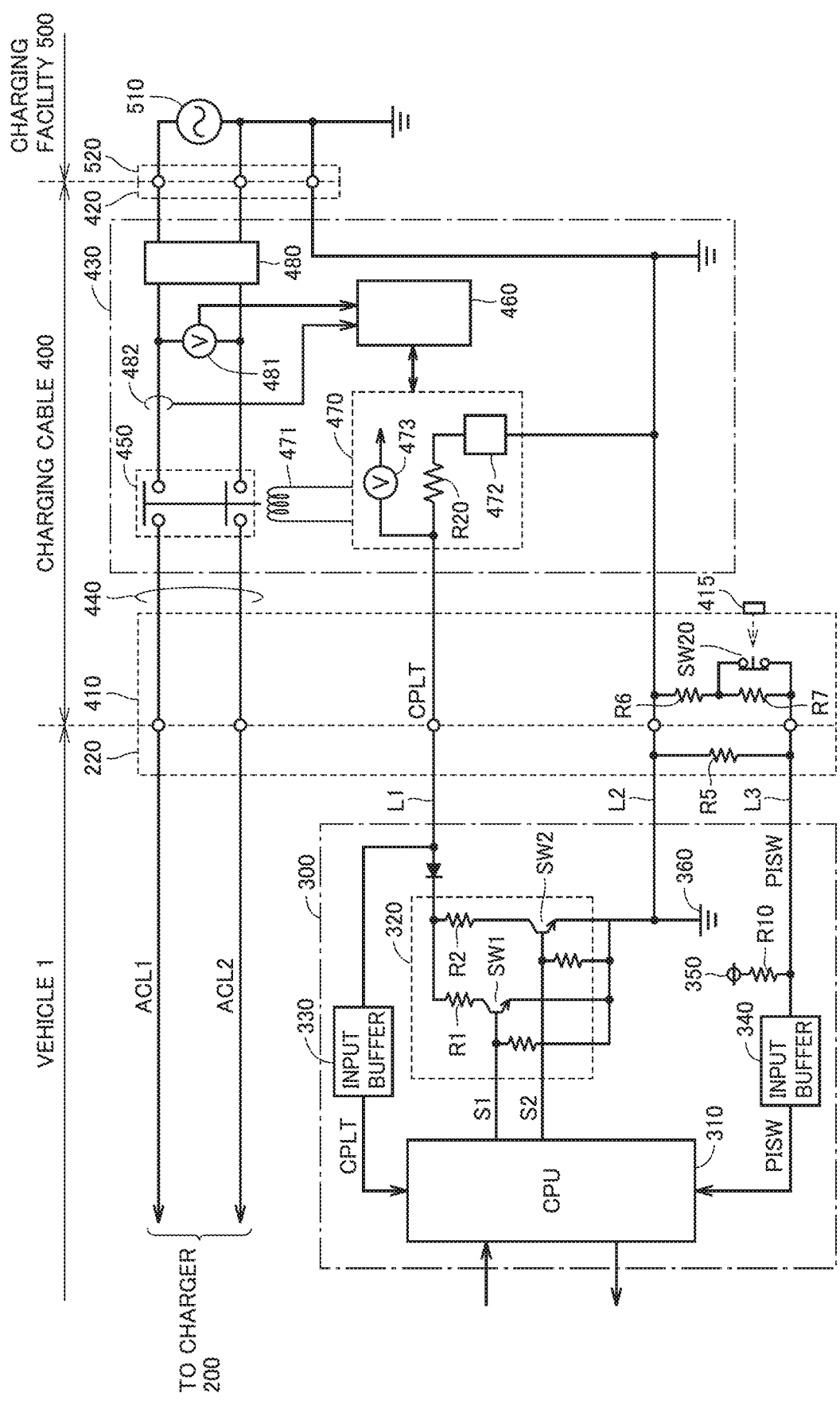
FIG. 5 shows an example circuit configuration of the charging system.

FIG. 5 shows an example circuit configuration of the charging system. In FIG. 5, charging connector 410 of charging cable 400 is connected to inlet 220.

ECU 300 of vehicle 1 receives a connection signal PISW having a potential that changes in accordance with a connection state between inlet 220 and charging connector 410. Based on the potential of connection signal PISW, ECU 300 determines whether or not charging connector 410 is connected to inlet 220.

When charging cable 400 is connected to charging facility 500 and inlet 220, ECU 300 receives a pilot signal CPLT from CCID 430 of charging cable 400 through a signal line L1. Pilot signal CPLT is a signal for providing a notification about a rated current of charging cable 400 from a CPLT control circuit 470 to ECU 300. In addition, pilot signal CPLT has a potential controlled by ECU 300 of vehicle 1 and is used as a signal for remotely controlling a CCID relay 450 from ECU 300.

CCID 430 in charging cable 400 includes CCID relay 450, a CCID control unit 460, CPLT control circuit 470, an electromagnetic coil 471, an electric leakage detector 480, a voltage sensor 481, and a current sensor 482.

CCID relay 450 is provided in a power feeding path to vehicle 1 and is controlled by CPLT control circuit 470. When CCID relay 450 is in an open state, the power feeding path is cut off, and thus, electric power cannot be supplied from charging facility 500 to vehicle 1. When CCID relay 450 is in a closed state, electric power can be supplied from charging facility 500 through charging cable 400 to vehicle 1.

CCID control unit 460 includes a CPU, a memory, an input and output port, and the like (all are not shown). CCID control unit 460 inputs and outputs the signals to and from various sensors and CPLT control circuit 470, and controls the operation of CPLT control circuit 470.

CPLT control circuit 470 outputs pilot signal CPLT to ECU 300 through charging connector 410 and inlet 220. Pilot signal CPLT has a potential controlled by ECU 300 of vehicle 1 and is used as a signal for remotely controlling CCID relay 450 from ECU 300. CPLT control circuit 470 controls CCID relay 450 based on the potential of pilot signal CPLT. Pilot signal CPLT is also used as a signal for providing a notification about the rated current of charging cable 400 from CPLT control circuit 470 to ECU 300.

Specifically, CPLT control circuit 470 includes an oscillator 472, a resistor R20 and a voltage sensor 473.

When the potential of pilot signal CPLT detected by voltage sensor 473 is a defined potential V1 (e.g., 12 V), oscillator 472 outputs non-oscillating pilot signal CPLT. When the potential of pilot signal CPLT drops to a potential V2 (e.g., 9 V) lower than above-described defined potential V1, oscillator 472 is controlled by CCID control unit 460 and outputs pilot signal CPLT that oscillates at a defined frequency (e.g., 1 kHz) and duty cycle.

The duty cycle of pilot signal CPLT is set in accordance with the rated current of charging cable 400. ECU 300 of vehicle 1 can detect the rated current of charging cable 400 based on the duty cycle of pilot signal CPLT received from CPLT control circuit 470 through signal line L1.

When the potential of pilot signal CPLT drops to V3 (e.g., 6 V) that is further lower than V2, CPLT control circuit 470 supplies a current to electromagnetic coil 471. When the current is supplied from CPLT control circuit 470 to electromagnetic coil 471, electromagnetic coil 471 generates electromagnetic force and CCID relay 450 enters the closed state. As a result, a power feeding voltage (voltage from charging facility 500) is applied to inlet 220 of vehicle 1 through charging cable 400.

Electric leakage detector 480 is provided at some midpoint in AC power line 440 of charging cable 400 within CCID 430, to detect the presence or absence of electric leakage. Specifically, electric leakage detector 480 detects an equilibrium state of currents flowing, in opposite directions, through a pair of power lines that form AC power line 440, and detects the occurrence of electric leakage when the equilibrium state is broken. When the electric leakage is detected by electric leakage detector 480, power feeding to electromagnetic coil 471 is stopped and CCID relay 450 enters the open state.

When plug 420 of charging cable 400 is inserted into electrical outlet 520, voltage sensor 481 detects a power supply voltage transmitted from charging facility 500, and provides a notification about the detected value to CCID control unit 460. Current sensor 482 detects a charging current flowing through AC power line 440, and provides a notification about the detected value to CCID control unit 460.

Resistors R6 and R7 and a switch SW20 are provided in charging connector 410. Resistors R6 and R7 and switch SW20 form a circuit that detects the connection state between charging connector 410 and inlet 220, together with a power supply node 350 and a pull-up resistor R10 provided in ECU 300 of vehicle 1 and a resistor R5 provided in inlet 220.

Resistors R6 and R7 are connected in series between a ground line L2 and a connection signal line L3. Switch SW20 is connected in parallel with resistor R7. Switch SW20 is implemented by, for example, a limit switch, and a contact point thereof is closed when charging connector 410 is connected to inlet 220. In addition, switch SW20 and push button 415 provided on charging connector 410 work together. Push button 415 is operated by the user when the user removes charging connector 410 from inlet 220. When push button 415 is not pressed, switch SW20 is in a closed state. When push button 415 is pressed, switch SW20 enters an open state.

With the above-described circuit configuration, in a state where charging connector 410 is not connected to inlet 220, a signal having a potential Vx determined by a voltage of power supply node 350, pull-up resistor R10 and resistor R5 is generated in connection signal line L3 as connection signal PISW.

In a state where charging connector 410 is connected to inlet 220 (push button 415 is not operated), a signal having a potential Vy determined by the voltage of power supply node 350, pull-up resistor R10 and resistors R5 and R6 is generated in connection signal line L3 as connection signal PISW. When push button 415 is operated in a state where charging connector 410 is inserted into inlet 220, a signal having a potential Vz determined by the voltage of power supply node 350, pull-up resistor R10 and resistors R5 to R7 is generated in connection signal line L3 as connection signal PISW. Therefore, ECU 300 can detect the connection state between charging connector 410 and inlet 220 by detecting the potential of connection signal PISW.

In vehicle 1, ECU 300 further includes CPU 310, a resistance circuit 320, and input buffers 330 and 340, in addition to above-described power supply node 350 and pull-up resistor R10.

Resistance circuit 320 is a circuit for controlling the potential of pilot signal CPLT communicated through signal line L1. Resistance circuit 320 includes pull-down resistors R1 and R2 and switches SW1 and SW2. Pull-down resistor R1 and switch SW1 are connected in series between signal line L1 through which pilot signal CPLT is communicated and a vehicle earth 360. Pull-down resistor R2 and switch SW2 are also connected in series between signal line L1 and vehicle earth 360. Switches SW1 and SW2 are controlled to an electrically conductive (on) state or an electrically non-conductive (off) state in accordance with control signals S1 and S2 from CPU 310, respectively.

Input buffer 330 is a circuit for introducing pilot signal CPLT into CPU 310 from signal line L1. Input buffer 340 is a circuit for introducing connection signal PISW into CPU 310 from connection signal line L3.

CPU 310 receives pilot signal CPLT from input buffer 330. In addition, CPU 310 receives connection signal PISW from input buffer 340. CPU 310 detects the potential of connection signal PISW, and detects the connection state between inlet 220 and charging connector 410 based on the potential of connection signal PISW. In addition, CPU 310 detects the rated current of charging cable 400 by detecting the oscillation state and the duty cycle of pilot signal CPLT.

Furthermore, when charging connector 410 is connected to inlet 220, CPU 310 controls the potential of pilot signal CPLT by controlling switches SW1 and SW2 in resistance circuit 320, and requests supply and stop of electric power for charging facility 500. Specifically, CPU 310 controls the potential of pilot signal CPLT, to thereby remotely control CCID relay 450 in charging cable 400.

When the contact point of CCID relay 450 in charging cable 400 is closed as a result of remote control by CPU 310, AC power from charging facility 500 is provided to charger 200 and preparation for AC charging is completed. CPU 310 controls charger 200 to convert the AC power from charging facility 500 into DC power that can be charged into battery 100 and output the DC power to battery 100. Thus, AC charging of battery 100 is performed.

FIG. 6 shows a correspondence relationship among the states of switches SW1 and SW2, the potential of pilot signal CPLT, and the state of CCID relay 450. In FIG. 6, the horizontal axis represents the time, and the vertical axis represents the potential of pilot signal CPLT, the states of switches SW1 and SW2, and the state of CCID relay 450.

Before time t1, charging cable 400 is not connected to vehicle 1 and charging facility 500. In this state, each of switches SW1 and SW2 and CCID relay 450 are off and the potential of pilot signal CPLT is 0 V.

When plug 420 of charging cable 400 is connected to electrical outlet 520 of charging facility 500 at time t1, CPLT control circuit 470 generates pilot signal CPLT in accordance with the electric power from charging facility 500. At time t1, charging connector 410 of charging cable 400 is not connected to inlet 220. The potential of pilot signal CPLT is V1 (e.g., 12 V) and pilot signal CPLT is in a non-oscillating state.

When charging connector 410 is connected to inlet 220 at time t2, the potential of connection signal PISW input to CPU 310 changes. In response to the change in potential of connection signal PISW, CPU 310 turns on switch SW2. As a result, the potential of pilot signal CPLT drops to V2 (e.g., 9 V) by pull-down resistor R2.

When CCID control unit 460 detects that the potential of pilot signal CPLT has dropped to V2, CCID control unit 460 outputs an oscillation instruction to oscillator 472 and oscillates pilot signal CPLT at time t3.

When CPU 310 detects that pilot signal CPLT has been oscillated, CPU 310 detects the rated current of charging cable 400 based on the duty cycle of pilot signal CPLT. Then, at time t4, CPU 310 turns on switch SW1, in addition to switch SW2. As a result, the potential of pilot signal CPLT further drops to V3 (e.g., 6 V) by pull-down resistor R1.

When the potential of pilot signal CPLT drops to V3 at time t5, the contact point of CCID relay 450 is closed by CPLT control circuit 470. As a result, the electric power from charging facility 500 is transmitted to vehicle 1 through charging cable 400. Thereafter, in vehicle 1, charger 200 (see FIG. 1) is controlled by CPU 310, and thus, AC charging of battery 100 is started.

<Stop and Resumption of AC Charging>

As described above, ECU 300 according to the present embodiment permits execution of the AC charging when locking device 50 is in the locked state. When locking device 50 is brought to the unlocked state during execution of the AC charging, ECU 300 stops the AC charging. As a result, exposure of charging connector 410 in a state where the electric power is being supplied and exposure of inlet 220 when battery 100 and inlet 220 are in an electrically conductive state are prevented.

"When locking device 50 is brought to the unlocked state during execution of the AC charging" refers to the case in which door unlock button 32 of smart key 30 is operated during the AC charging. The operation performed on door unlock button 32 of smart key 30 corresponds to one example of "prescribed operation" according to the present disclosure. That is, when the prescribed operation is performed during execution of the AC charging, ECU 300 stops the AC charging.

When door unlock button 32 of smart key 30 is operated during the AC charging, ECU 300 brings entrance doors 170 to the door-unlocked state. Furthermore, in conjunction with the operation of door unlock button 32, ECU 300 brings locking device 50 from the locked state to the unlocked state, and controls the potential of pilot signal CPLT (e.g., controls the potential of pilot signal CPLT to V2) to stop the AC charging. When the AC charging is performed with entrance doors 170 being in the door-unlocked state, ECU 300 continues the door-unlocked state and brings locking device 50 to the unlocked state in response to the operation of door unlock button 32, and stops the AC charging. "During execution of the AC charging" refers to a case in which a preset charging time period does not elapse from the start of the AC charging, a case in which the SOC of battery 100 does not yet reach a set prescribed SOC (e.g., 100%), or the like.

A plurality of cases are assumed as the case in which the user operates door unlock button 32 of smart key 30 during the AC charging. For example, a case (1) in which the user operates door unlock button 32 in order to take out a baggage in vehicle 1, a case (2) in which the user operates door unlock button 32 by mistake, a case (3) in which the user operates door unlock button 32 with the intention of ending the AC charging, or the like is assumed.

When the AC charging is stopped in the above-described cases (1) and (2), the user may in some cases have no recognition that the AC charging has been stopped. For example, the user may operate door unlock button 32 in order to take out the baggage in vehicle 1, and after taking out the baggage, operate door lock button 31 and leave vehicle 1. In this case, the AC charging is stopped by the operation of door unlock button 32. In spite of this, if the user has a recognition that the AC charging continues (i.e., the user did not intend to stop the AC charging), a charging opportunity is lost. Therefore, it is desired to resume the AC charging when charging connector 410 is still connected to inlet 220 after a lapse of a prescribed time period from the stop of the AC charging, for example.

In contrast, when the AC charging is stopped in the above-described case (3), the user wants to end the AC charging. However, disconnection of the connector from the inlet within the prescribed time period may be impossible for some reasons. If the AC charging is resumed when charging connector 410 is still connected to inlet 220 after a lapse of the prescribed time period from the stop of the AC charging in order to satisfy the above-described cases (1) and (2), the AC charging may in some cases be resumed although the user has no intention of continuing the AC charging.

Accordingly, in vehicle 1 according to the present embodiment, when the AC charging is stopped during execution of the AC charging, timer 312 is started up to start clocking. Until a prescribed time period elapses from the start of clocking, it is monitored whether or not a resume condition is satisfied. A condition that makes it possible to estimate that the user has an intention of resuming the AC charging is set as the resume condition. By determining whether or not the resume condition is satisfied, in addition to determination as to whether or not charging connector 410 is connected to inlet 220 after a lapse of the prescribed time period, it can be estimated whether or not the user has an intention of resuming the AC charging. When the resume condition is satisfied within the prescribed time period, and when charging connector 410 is connected to inlet 220 after a lapse of the prescribed time period, it is estimated that the user has an intention of resuming the AC charging, and the AC charging is resumed. When the resume condition is not satisfied within the prescribed time period, it is estimated that the user has no intention of resuming the AC charging, and the AC charging is not resumed, even if charging connector 410 is connected to inlet 220 after a lapse of the prescribed time period. When charging connector 410 is not connected to inlet 220 after a lapse of the prescribed time period, the AC charging is not resumed, even if the resume condition is satisfied within the prescribed time period.

Specifically, when at least one of the following conditions (A) to (E) is satisfied, it can be determined that the resume condition is satisfied:

(A) a condition that one of entrance doors 170 has been opened;

(B) a condition that one of entrance doors 170 has been closed;

(C) a condition that one of entrance doors 170 has been opened and closed;

(D) a condition that door lock button 31 has been operated; and (E) a condition that the result of the verification process has changed from successful verification to unsuccessful verification.

When the resume condition is satisfied, it can be estimated that the user has an intention of continuing the AC charging. For example, in (A) to (C) described above, the user having performed the operation for opening one of entrance doors 170 of vehicle 1 and/or the operation for closing one of entrance doors 170 of vehicle 1 without disconnection of charging connector 410 from inlet 220 even after a lapse of the prescribed time period from the stop of the AC charging means that the user is, for example, taking out the baggage in vehicle 1, and thus, it can be estimated that the user has no intention of ending the AC charging (has an intention of resuming the AC charging). In (D) described above, the user having operated door lock button 31 to lock entrance doors 170 of vehicle 1 (bring door lock device 190 to the locked state) without disconnection of charging connector 410 from inlet 220 means that the user does not use vehicle 1, and thus, it can be estimated that the user has an intention of resuming the AC charging. In (E) described above, since the user carrying smart key 30 leaves vehicle 1 without disconnection of charging connector 410 from inlet 220, it can be estimated that the user has an intention of resuming the AC charging.

The prescribed time period may only be set to be equal to or longer than a time period during which charging connector 410 can be removed from inlet 220, and can be set as appropriate.

By determining whether or not the resume condition is satisfied within the prescribed time period, in addition to determination as to whether or not charging connector 410 is connected to inlet 220 after a lapse of the prescribed time period from the stop of the AC charging, the AC charging can be resumed based on the user's intention.

<Process Performed by ECU>

FIG. 7 is a flowchart showing a procedure of a process performed by ECU 300. The process of the flowchart shown in FIG. 7 is started when charging connector 410 is connected to inlet 220 and AC charging is started. Each step (abbreviated as "S" hereinafter) in the flowcharts shown in FIG. 7 and below-described FIG. 8 is described as being implemented by software processing by ECU 300. However, a part or all of the steps may be implemented by hardware (electric circuit) formed in ECU 300.

When the AC charging is started, ECU 300 determines whether or not the prescribed operation has been performed (S10). In the present embodiment, the prescribed operation refers to the operation performed on door unlock button 32 of smart key 30.

When the prescribed operation has not been performed (NO in S10), ECU 300 continues the AC charging (S20). Then, ECU 300 determines whether or not the SOC of battery 100 has reached the prescribed SOC (S30). In S30, instead of or in addition to the determination as to whether or not the SOC of battery 100 has reached the prescribed SOC, it may be determined whether or not the preset charging time period has elapsed from the start of the AC charging.

When the SOC of battery 100 has reached the prescribed SOC (YES in S30), ECU 300 ends the process. In contrast, when the SOC of battery 100 has not reached the prescribed SOC (NO in S30), ECU 300 returns the process to S10.

When the prescribed operation has been performed in S10 (YES in S10), ECU 300 performs a charging stop process (S40).

FIG. 8 is a flowchart showing a procedure of a process performed during the charging stop process. When the charging stop process is started, ECU 300 brings locking device 50 to the unlocked state, and controls the potential of pilot signal CPLT, to thereby stop the AC charging (S401). Specifically, ECU 300 controls the potential of pilot signal CPLT to, for example, V2. As a result, CCID relay 450 enters the open state and the AC charging is stopped.

When the AC charging is stopped in S401, ECU 300 starts up timer 312 to start clocking (S403). Then, until the prescribed time period elapses from the start of clocking, ECU 300 monitors whether or not the resume condition is satisfied (S405). Specifically, ECU 300 monitors whether or not at least one of (A) to (E) described above is satisfied. When the resume condition is satisfied, ECU 300 sets a flag indicating that the resume condition has been satisfied, for example.

Until the prescribed time period elapses from the start of clocking (NO in S407), ECU 300 continues monitoring whether or not the resume condition is satisfied. When the prescribed time period elapses from the start of clocking (YES in S407), ECU 300 ends the charging stop process.

Referring again to FIG. 7, when ECU 300 ends the charging stop process, ECU 300 determines whether or not the resume condition has been satisfied during the prescribed time period (S50). Specifically, ECU 300 determines whether or not the resume condition has been satisfied during the prescribed time period, based on whether or not the flag indicating that the resume condition has been satisfied is set.

When the resume condition has been satisfied during the prescribed time period (YES in S50), ECU 300 determines whether or not charging connector 410 is connected to inlet 220 (S60).

When charging connector 410 is connected to inlet 220 (YES in S60), ECU 300 brings locking device 50 to the locked state (S70). That is, when the resume condition has been satisfied during the prescribed time period and when charging connector 410 is connected to inlet 220 after a lapse of the prescribed time period, ECU 300 brings locking device 50 to the locked state.

Then, ECU 300 resumes the AC charging (S80). Specifically, ECU 300 controls the potential of pilot signal CPLT to resume the AC charging. More specifically, ECU 300 controls the potential of pilot signal CPLT to V3. As a result, CCID relay 450 enters the closed state and the AC charging is again performed.

In contrast, when the resume condition has not been satisfied during the prescribed time period (NO in S50), ECU 300 ends the process. That is, when the resume condition has not been satisfied during the prescribed time period, ECU 300 does not resume the AC charging. In this case, the process ends, with locking device 50 remaining in the unlocked state.

When charging connector 410 is not connected to inlet 220 in S60 (NO in S60), ECU 300 ends the process. That is, when charging connector 410 is not connected to inlet 220 even if the resume condition has been satisfied during the prescribed time period, ECU 300 does not resume the AC charging.

As described above, in vehicle 1 according to the present embodiment, when the prescribed operation is performed during execution of the AC charging, locking device 50 is brought to the unlocked state and the AC charging is stopped. When the resume condition is satisfied during the prescribed time period after the AC charging is stopped, and when charging connector 410 is connected to inlet 220 after a lapse of the prescribed time period, locking device 50 is brought to the locked state and the AC charging is resumed. By determining whether or not the resume condition is satisfied during the prescribed time period, in addition to determination as to whether or not charging connector 410 is connected to inlet 220, it can be estimated whether or not the user has an intention of resuming the AC charging. As a result, the AC charging can be resumed based on the user's intention.

When the resume condition is not satisfied during the prescribed time period after the AC charging is stopped, it is estimated that the user has no intention of resuming the AC charging, and the AC charging is not resumed, even if charging connector 410 is connected to inlet 220. As a result, the AC charging can be ended based on the user's intention.

[First Modification]

Vehicle 1 may include a timer charging function. The timer charging function refers to the function of starting electric power supply to battery 100 when the start time set by the user comes. When the timer charging function is used, the user sets the start time and connects charging connector 410 to inlet 220. When the start time comes, ECU 300 starts electric power supply to battery 100.

When the timer charging function is used, a time period from when the user sets the start time and connects charging connector 410 to inlet 220 to when the AC charging is completed (when the prescribed SOC is reached and/or the charging time comes) is defined as a time period from the start of the AC charging to the end of the AC charging. That is, a time period from when charging connector 410 is connected to inlet 220 to when the electric power from charging facility 500 is supplied to vehicle 1 (battery 100) is also included in "during execution of the AC charging".

In the case of using the timer charging function, when the prescribed operation is performed during a time period from when charging connector 410 is connected to inlet 220 to when the start time comes, ECU 300 brings locking device 50 to the unlocked state and stops timer charging (stops the AC charging). When the resume condition is satisfied during the prescribed time period after the timer charging is stopped, and when charging connector 410 is connected to inlet 220 after a lapse of the prescribed time period, ECU 300 brings locking device 50 to the locked state and resumes the timer charging. As a result, the timer charging can be resumed based on the user's intention. After the start time comes and electric power supply to battery 100 is started, a process similar to that of the embodiment is performed.

[Second Modification]

In a second modification, another example of the prescribed operation will be described. In the embodiment, description has been given of the case in which the prescribed operation is the operation performed on door unlock button 32 of smart key 30. When smart key 30 is provided with an unlock button for bringing locking device 50 to the unlocked state, the prescribed operation may be an operation performed on the unlock button.

Referring again to FIG. 1, smart key 30 is provided with a first unlock button 33 for bringing locking device 50 to the unlocked state. By operating first unlock button 33, the user can bring locking device 50 to the unlocked state. First unlock button 33 corresponds to one example of "first release switch" according to the present disclosure.

When ECU 300 detects, through antenna 150, that first unlock button 33 has been operated, ECU 300 brings locking device 50 to the unlocked state and stops the AC charging. By operating first unlock button 33 provided on smart key 30, the user can stop the AC charging.

[Third Modification]

In a third modification, still another example of the prescribed operation will be described. When vehicle 1 is provided with an unlock button for bringing locking device 50 to the unlocked state, the prescribed operation may be an operation performed on the unlock button.

Referring again to FIG. 2, a second unlock button 230 for bringing locking device 50 to the unlocked state is provided near inlet 220. By operating second unlock button 230, the user can bring locking device 50 to the unlocked state. Second unlock button 230 corresponds to one example of "second release switch" according to the present disclosure.

When ECU 300 detects that second unlock button 230 has been operated, ECU 300 brings locking device 50 to the unlocked state and stops the AC charging. By operating second unlock button 230 provided near inlet 220, the user can stop the AC charging.

[Fourth Modification]

In a fourth modification, further example of the prescribed operation will be described. Vehicle 1 may be configured to switch between the door-locked state and the door-unlocked state of entrance door 170 based on an operation performed on a door knob of entrance door 170, when successful verification is determined in the verification process. In this case, the prescribed operation may be the operation performed on the door knob of entrance door 170 when successful verification is determined in the verification process. Examples of the operation performed on the door knob include an operation for the user to touch the door knob, an operation for the user to press a button (not shown) provided adjacently to the door knob, or the like.

When successful verification is determined in the verification process and when the user touches the door knob of entrance door 170, for example, ECU 300 controls door lock device 190 to switch entrance door 170 from the door-locked state to the door-unlocked state or from the door-unlocked state to the door-locked state.

When entrance door 170 is switched from the door-locked state to the door-unlocked state during execution of the AC charging as described above, ECU 300 brings locking device 50 from the locked state to the unlocked state and stops the AC charging. By having smart key 30 and touching the door knob of vehicle 1 during execution of the AC charging, the user can stop the AC charging.

As the resume condition, a condition that entrance door 170 has been switched from the door-unlocked state to the door-locked state as a result of touching of the door knob when successful verification is determined in the verification process may be applied. That is, by touching the door knob and switching entrance door 170 from the door-unlocked state to the door-locked state within a prescribed time period after the AC charging is stopped, the user can resume the AC charging when charging connector 410 is connected to inlet 220.

[Fifth Modification]

In the embodiment, description has been given of the case in which the external charging is the AC charging. However, the external charging is not limited to the AC charging and may be DC charging for charging battery 100 mounted on vehicle 1, using electric power supplied from a DC power supply external to vehicle 1. The present disclosure is also applicable to the DC charging, similarly to the AC charging.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle that performs external charging to charge a power storage device mounted on the vehicle, using electric power supplied through a charging cable from a power supply external to the vehicle, the vehicle comprising:
an inlet to which a connector provided in the charging cable is connectable;
a locking device that switches between a locked state and an unlocked state, the connector connected to the inlet being not able to be removed from the inlet in the locked state, the connector connected to the inlet being able to be removed from the inlet in the unlocked state; and
a controller that permits execution of the external charging when the locking device is in the locked state, wherein
when the controller detects that the connector is connected to the inlet, the controller brings the locking device to the locked state,
when a prescribed operation is performed during execution of the external charging, the controller brings the locking device to the unlocked state and stops the external charging, and when a predetermined resume condition is satisfied within a prescribed time period after the external charging is stopped, and when the connector is connected to the inlet, the controller brings the locking device to the locked state and resumes the external charging.

2. The vehicle according to claim 1, wherein
when the resume condition is not satisfied within the prescribed time period, the controller does not resume the external charging.

3. The vehicle according to claim 1, wherein
the resume condition includes at least one of a condition that a door of the vehicle has been opened and a condition that the door of the vehicle has been closed.

4. The vehicle according to claim 1, further comprising a door lock device that prohibits opening and closing of a door of the vehicle, wherein
the resume condition includes a condition that an operation for bringing the door lock device to a door-locked state has been performed.

5. The vehicle according to claim 4, wherein
the prescribed operation includes a door-unlock operation for releasing the door-locked state of the door lock device.

6. The vehicle according to claim 1, further comprising an antenna that transmits a signal to a smart key of the vehicle, the smart key being located within a prescribed range from the vehicle, wherein
the resume condition includes a condition that the smart key has moved from within the prescribed range to outside the prescribed range, and
when the controller receives, from the smart key, a response signal to the signal transmitted through the antenna, the controller determines that the smart key is located within the prescribed range, and when the controller does not receive the response signal from the smart key, the controller determines that the smart key is located outside the prescribed range.

7. The vehicle according to claim 6, wherein
the smart key is provided with a first release switch that brings the locking device to the unlocked state, and
the prescribed operation includes an operation of the first release switch.

8. The vehicle according to claim 1, further comprising a second release switch that brings the locking device to the unlocked state, wherein
the prescribed operation includes an operation of the second release switch.

* * * * *